United States Patent Office 2,910,508
Patented Oct. 27, 1959

2,910,508

POLYOXYALKYLENE GLYCOL MONOETHERS OF THIOPHENOLIC DERIVATIVES OF HALOCYCLOALKENES

Herman S. Bloch, Skokie, and Louis Schmerling, Riverside, Ill., assignors, by mesne assignments, to Universal Oil Products Company, Des Plaines, Ill., a corporation of Delaware No Drawing. Application May 5, 1958
Serial No. 732,804

11 Claims. (Cl. 260—609)

This invention relates to new compositions of matter and to a method for the preparation thereof. More particularly the invention relates to a method for preparing polyoxyalkylene glycol monothioethers of a thiophenolic derivative of a halocycloalkene.

Insecticidal compositions which are soluble in water and, in addition, are surface-active agents have many advantages over the conventional type of insecticide. Advantages which may be found in having such an insecticide include the elimination of the need for an emulsifying agent in preparing an aqueous solution of the insecticide, as well as a reduction in the cost of the preparation of said solution. Furthermore, the solutions are surface-active and when used in detergent formulations will yield clean surfaces which retain insecticidal properties after the cleansing operation is completed.

It is therefore an object of this invention to prepare water-soluble surface-active insecticidal compositions.

A further object of this invention is to prepare polyoxyalkylene glycol monothioethers of thiophenolic derivatives of halocycloalkenes.

One embodiment of this invention resides in a process for the preparation of a polyoxyalkylene glycol monothioether of a thiophenolic derivative of a halocycloalkene which comprises condensing an unsaturated side chain derivative of a thiophenol with a halo substituted unsaturated compound selected from the group consisting of haloalkadienes and halocycloalkadienes, reacting the resultant condensation product with an alkylene oxide, and recovering the desired polyoxyalkylene glycol monothioether of a thiophenolic derivative of a halocycloalkene.

A specific embodiment of the invention is found in a process for the preparation of a polyoxyalkylene glycol monothioether of a thiophenolic derivative of a halocycloalkene which comprises condensing an unsaturated side chain derivative of a thiophenol with hexachlorocyclopentadiene at a temperature in the range of from about 20° to about 250° C., reacting the resultant condensation product with an alkylene oxide, and recovering the desired polyoxyalkylene glycol monothioether of a thiophenolic derivative of a halocycloalkene.

A more specific embodiment of this invention resides in a process for the preparation of a polyoxyalkylene glycol monothioether of a thiophenolic derivative of a halocycloalkene which comprises condensing o-allyl-thiophenol with hexachlorocyclopentadiene at a temperature in the range of from about 20° to about 250° C., reacting a molecular proportion of the resultant 1,2,3,4,7,7-hexachloro-5-(2-mercaptobenzyl)-2-norbornene with 2 molecular proportions of ethylene oxide, and recovering the resultant 1,2,3,4,7,7-hexachloro-5-[2-(6-hydroxy-4-oxa-1-thiahexyl)benzyl]-2-norbornene.

Yet another embodiment of this invention is found in a polyoxyalkylene glycol monothioether of a thiophenolic derivative of a halocycloalkene.

Other objects and embodiments referring to alternative unsaturated side chain derivatives of a thiophenol, alternative halo substituted alkadienes and halo substituted cycloalkadienes and to alternative alkylene oxides will be found in the following further detailed description of the invention.

The compounds formed by the process of this invention will find a wide variety of uses in the chemical field especially as insecticides, and more particularly as water-soluble surface-active insecticides. For example, the condensation product which results from the reaction between hexachlorocyclopentadiene and o-allylthiophenol, followed by condensing the resultant product with two moles of ethylene oxide, namely, 1,2,3,4,7,7-hexachloro-5-[2-(6-hydroxy-4-oxa-1-thiahexyl)benzyl]-2-norbornene is active as an insecticide, especially against houseflies. In addition, the reaction products of this invention may also be used as intermediates in the preparation of resins, pharmaceuticals, plastics, etc. For purposes of this invention the term "halocycloalkenes" will refer to halocycloalkenes, polyhalocycloalkenes, halobicycloalkenes and polyhalobicycloalkenes. In addition, the term "halo" will refer to both mono and polyhalo compounds.

The process of this invention in which the halo substituted conjugated diolefin, either straight chain or cyclic, is condensed with the unsaturated side chain derivative of a thiophenol takes place at temperatures in the range of from about 20° to about 250° C. and often preferably at a temperature in the range of from about 80° to about 180° C., the reaction temperature being dependent upon the particular reactants which are to be condensed. Generally speaking, the reaction will take place at atmospheric pressure; however, if higher temperatures are to be used when condensing a lower boiling halogenated diene with the unsaturated side chain derivative of the thiophenol, superatmospheric pressures ranging from about 2 to about 100 atmospheres or more will be used, the amount of pressure used being that necessary to maintain at least a portion of the reactants in the liquid phase. In addition, if so desired, the reaction may take place in the presence of inert organic solvents including aromatic solvents such as benzene, toluene, o-, m- and p-xylene, ethylbenzene, etc., alcohols such as methyl alcohol, ethyl alcohol, propyl alcohol, etc.; ethers such as dimethyl ether, diethyl ether, dipropyl ether, etc., saturated low molecular weight aliphatic hydrocarbons such as pentane, hexane, heptane, etc.; or acetone, acetic acid, etc.

The condensation step between the reaction product of the halo substituted conjugated diene and the unsaturated side chain derivative of the thiophenol and the alkylene oxide will also be effected at temperatures and pressures similar to those stated in the above paragraph, namely, at temperatures in the range of from about 20° to about 250° C. and at pressures ranging from about atmospheric to about 100 atmospheres or more, both temperature and pressure being dependent upon the particular reactants undergoing condensation.

The desired water soluble insecticide will have the generic formula:

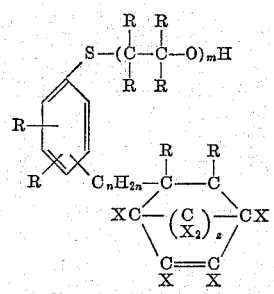

if a halocycloalkadiene is used where z is 1 or 2, or the generic formula:

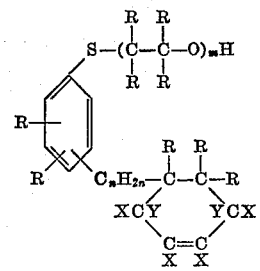

if a haloalkadiene is used. In the above formulae the several R substituents are independently selected from the group consisting of hydrogen and alkyl radicals, the several X substituents are independently selected from the group consisting of hydrogen, alkyl, haloalkyl and halogen radicals (at least one X group being halogen or haloalkyl), the Y substituents are independently selected from the group consisting of hydrogen, haloalkyl and alkyl, $m$ is an integer of from 2 to about 20 and $n$ is an integer of from 0 to about 8. The value of $m$ in the above formulae will depend upon the mole ratio of the alkylene oxide to the condensation product of the reaction between the unsaturated side chain derivative of a thiophenol and the halocycloalkadiene or haloalkadiene. For example, if $m$ is 2 the mole ratio of alkylene oxide to the aforementioned condensation product is 2:1 and so on as $m$ increases in size.

Unsaturated compounds containing a halogen substituent which may be reacted with the unsaturated side chain derivative of a thiophenol in the process of the present invention include straight-chain diolefins having the general formula:

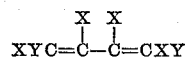

in which X is independently selected from the group consisting of hydrogen, alkyl, haloalkyl or halogen radicals having an atomic weight of from 35 to 127 (i.e. chlorine, bromine or iodine), at least one X being halogen or haloalkyl and Y is independently selected from the group consisting of alkyl, haloalkyl, and hydrogen radicals; or polyhalocycloalkadienes having the general formula:

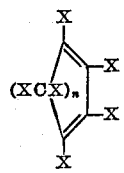

in which X has the same meaning as above and $n$ is 1 or 2. Examples of these compounds include haloalkadienes such as 1- and 2-chloro-1,3-butadiene, 1,3-, 2,3- and 1,4-dichloro-1,3-butadiene, 1- and 2-bromo-1,3-butadiene, 1,3-, 2,3- and 1,4-dibromo-1,3-butadiene, 1,3-, 2,3- and 1,4 - diiodo - 1,3 - butadiene, 1,2,3 - trichloro - 1,3 - butadiene, 1,2,3 - tribromo - 1,3 - butadiene, 1- and 2-iodo - 1,3 - butadiene, 1,2 - diiodo - 1,3 - butadiene, 1,2,3-triiodo - 1,3 - butadiene, 1,2,4 - trichloro - 1,3 - butadiene, 1,2,4 - tribromo - 1,3 - butadiene, 1,2,4 - triiodo - 1,3-butadiene, 1,2,3,4 - tetrachloro - 1,3 - butadiene, 1,2,3,4-tetrabromo - 1,3 - butadiene, 1,2,3,4 - tetraiodo - 1,3-butadiene, 1,3 - dichloro - 2 - methyl - 1,3 - butadiene, 1,4 - dichloro - 2 - methyl - 1,3 - butadiene, 1,3,4 - trichloro - 2 -methyl - 1,3 - butadiene, 1,4 - dichloro - 2-chloromethyl - 1,3 - butadiene, 1,4 - dichloro - 2 - dichloromethyl - 1,3 - butadiene, 1,3 - dibromo - 2 - methyl-1,3 - butadiene, 1,4 - dibromo - 2 - methyl - 1,3 - butadiene, 1,4 - dibromo - 2 - bromomethyl - 1,3 - butadiene, 1,4 - dibromo - 2 - dibromomethyl - 1,3 - butadiene, 1,3,4-tribromo - 2 - methyl - 1,3 - butadiene, 1,3 - diiodo - 2-methyl - 1,3 - butadiene, 1,4 - diiodo - 2 - methyl - 1,3-butadiene, 1,4 - diiodo - 2 - iodomethyl - 1,3 - butadiene, 1,4 - diiodo - 2 - diiodomethyl - 1,3 - butadiene, 1,3,4 - triiodo - 2 - methyl - 1,3 - butadiene, etc.; and halocycloalkadienes such as halogenated 1,3 - cyclopentadienes which for purposes of this invention will be designated as halogenated cyclopentadienes including 1-chlorocyclopentadiene, 1,2- and other dichlorocyclopentadienes, 1,2,3- and other trichlorocyclopentadienes, 1,2,3,4- and other tetrachlorocyclopentadienes, 1,2,3,4,5- and other pentachlorocyclopentadienes, hexachlorocyclopentadiene, the corresponding bromo- and iodo- derivatives, etc. It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro - 1,3 - cyclohexadiene, etc., 1,2 - dibromo - 1,3 - cyclohexadiene, 1,2,3 - tribromo - 1,3-cyclohexadiene, octabromo - 1,3 - cyclohexadiene, 1,2-diiodo - 1,3 - cyclohexadiene, 1,2,3 - triiodo - 1,3 - cyclohexadiene, octaiodo - 1,3 - cyclohexadiene, etc., may also be used. Furthermore, it is contemplated within the scope of this invention that fluorine analogs of the aforementioned unsaturated compounds such as hexafluorocyclopentadiene or 2,3-difluoro-1,3-butadiene may also be used, although not necessarily with equivalent results. Generally speaking the iodine, bromine and chlorine containing compounds are preferred because of their relatively greater availability and lower cost. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro - 3 - bromo - 1,3 - butadiene, 1 - iodo - 3 - chloro-1,3 - butadiene, 2 - bromo - 3 - chloro - 1,3 - butadiene, 1,4 - dichloro - 2 - bromomethyl - 1,3 - butadiene, 1,4-dichloro - 2 - iodomethyl - 1,3 - butadiene, 1 - chloro - 2-bromocyclopentadiene, 1,2 - dichloro - 3 - bromocyclopentadiene, 1,2 - dichloro - 5,5 - dibromocyclopentadiene, etc., although not necessarily with equivalent results.

Unsaturated side chain derivatives of a thiophenol have the general formula:

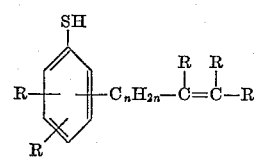

in which the several R groups are independently selected from the group consisting of hydrogen, alkyl and aryl radicals, and $n$ is an integer of from 0 to about 8. Suitable compounds which may be used include o-vinylthiophenol, m-vinylthiophenol, p-vinylthiophenol, o-allylthiophenol, m-allylthiophenol, p-allylthiophenol, o-crotylthiophenol, m-crotylthiophenol, p-crotylthiophenol, o-methallylthiophenol, m-methallylthiophenol, p-methallylthiophenol, the isomeric o-, m- and p-pentenyl, hexenyl, heptenyl, octenyl, nonenyl and decenyl substituted thiophenols, etc., 3-vinyl-o-thiocresol, 3-allyl-o-thiocresol, 3-methallyl-o-thiocresol, 3 - crotonyl - o - thiocresol, 4 - vinyl - o-thiocresol, 4-allyl-o-thiocresol, 4-methallyl-o-thiocresol, 4-crotonyl-o-thiocresol, 4-vinyl-m-thiocresol, 4-allyl-m-thiocresol, 4-methallyl-m-thiocresol, 4-crotonyl-m-thiocresol, 2-vinyl-p-thiocresol, 2-allyl-p-thiocresol, 2-methallyl-p-thiocresol, 2-crotonyl-p-thiocresol, the isomeric pentenyl, hexenyl, heptenyl, octenyl, nonenyl and decenyl substituted thiocresols, etc. It is to be understood that the aforementioned thiophenols containing an unsaturated side chain linkage are only representatives of the class of compounds which may be used and that the process of this invention is not necessarily limited thereto.

Alkylene oxides which may be used in the process of this invention comprise ethylene oxide, 1,2-propylene oxide, 2,3-butylene oxide, 1,2-pentene oxide, 2,3-pentene oxide, etc., the preferred epoxides comprising ethylene oxide and propylene oxide due to their relatively greater availability and lower cost.

The volatility of the insecticides produced according to this invention is, of course, dependent upon their molecular weight and when a product having low volatility is especially desired in a particular application, such as a high degree of retentivity or activity to which the pesticide is applied, the molecular weight may be raised both by using relatively high-boiling components in the first step of the present invention and by the choice and number of moles of alkylene oxide used in the second step.

The physical properties of the present polyhalo derivatives of substituted thiophenolic ethers, and the effects they have on entomological forms of life make them particularly desirable as insecticides and insect repellents, the compounds having many of the features desired of materials for this purpose. They are, for example, toxic to insects which are destructive of plant life and materials normally subject to insect infestation, their toxic effects being manifested by contact of the insect with the poison. The insecticides comprising the compounds of the present invention are thus effective against chewing as well as sucking types of insects. In addition, the compounds may be made sufficiently volatile so that when applied to plant life intended for human consumption, the plants when harvested and after allowing a reasonable time for evaporation of the applied insecticides therefrom retain insufficient quantities of the toxicant to prevent use of the plants as food. On the other hand, the compounds may be made of sufficiently limited volatility to be retained on the insect for the time required to accomplish their toxic effects.

If so desired, the insecticides of the present invention may be combined with water or other diluent, said diluent being employed for the specific purpose of reducing the concentration of insecticides to the desired level in specific insecticide formulations. The particular formulation of active components in combination with the solvent or dispersant will depend upon its application. Compositions containing as high as 20% of active component may be preferred in some instances to allow deep penetration of the insecticides, as in the treatment of fibrous material, such as wood, for extinction of particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice of the most desirable concentration and also whether or not the insecticide is dissolved or emulsified in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide, from which the liquid may be vaporized as a mist containing suspended quantities of the active component, thus providing a convenient spraying method of applying the insecticide.

The process of this invention may be effected in any suitable manner and may comprise either a batch or a continuous type operation. For example, when a batch type operation is used a quantity of the starting materials comprising an unsaturated side chain derivative of a thiophenol, the halo substituted alkadiene or halo substituted cycloalkadiene and, if so desired, an inert organic solvent is placed in a condensation apparatus provided with heating and mixing means. The apparatus is then heated to the desired temperature and pressure and maintained thereat for a predetermined period of time, at the end of which time the apparatus and contents thereof are allowed to cool to room temperature. The desired intermediate condensation product is separated from unreacted starting materials and by-products by conventional means such as fractional distillation, crystallization, etc.

Alternatively, the unsaturated side chain derivative of a thiophenol and the solvent, if any, may be heated to the desired reaction temperature and the halo substituted alkadiene or cycloalkadiene may be added gradually. The intermediate condensation product of the aforementioned reaction is then placed in a separate apparatus or, if so desired, may be returned to the original reaction apparatus and admixed with a molecular excess of alkylene oxide. The apparatus and contents thereof are then heated to the desired reaction temperature, and as in the first step of the process of this invention, maintained thereat for a suitable residence time. At the end of this time the apparatus and contents thereof are cooled to room temperature and the desired reaction product, comprising a polyoxyalkylene glycol monothioether of a thiophenolic derivative of a halocycloalkene is separated, purified and recovered by the conventional means hereinbefore set forth.

Another method of effecting the condensation reaction of the present invention is by a continuous type operation. In this type of operation the starting materials comprising the unsaturated side chain derivative of the thiophenol and the halo substituted alkadiene or cycloalkadiene are continuously charged to a reactor which is maintained at the proper operating conditions of temperature and pressure. The reactor may comprise an unpacked vessel or coil or may be lined with an adsorbent packing material such as fire brick, alumina, Berl saddles and the like. If so desired, an inert organic solvent of the type hereinbefore set forth may be added through a separate line or admixed with one or other of the starting materials prior to entry into said reactor and charged thereto in a single line. The reaction product is continuously withdrawn from the reactor, separated from the reactor effluent and continuously charged to a second reactor, while the unreacted starting materials are separated and recharged to the first reactor as a portion of the feed stock. After being charged to the second reactor the intermediate condensation product is condensed with an alkylene oxide which is continuously charged through a separate line to the second reactor. The latter is also maintained at suitable operating conditions of temperature and pressure. The desired condensation product, comprising the polyoxyalkylene glycol monothioether of a thiophenolic derivative of a halocycloalkene is separated and purified by means similar to those hereinbefore set forth.

Examples of water-soluble surface-active insecticides which may be prepared according to this invention include 1,2 - dichloro-4-[2-(6-hydroxy-4-oxa-1-thiahexyl) benzyl] - 1 - cyclohexene, 1,2-dichloro-4-[2-(6-hydroxy-4-oxa-1-thiahexyl)phenyl]-1-cyclohexene, 1,2,3 - trichloro-4 - [2 - (6-hydroxy-4-oxa-1-thiahexyl)benzyl] - 1 - cyclohexene, 1,2,3-trichloro-4-[2-(6-hydroxy-4-oxa-1-thiahexyl)phenyl]-1-cyclohexene, 1,2-dichloro-4-[3-methyl-4-(6-hydroxy-4-oxa - thiahexyl)benzyl] - 1 - cyclohexene, 1,2-dichloro-4-[3-methyl-4-(6-hydroxy-4-oxa - 1 - thiahexyl) phenyl]-1-cyclohexene, 1,2-dibromo-4-[2-(6-hydroxy-4-oxa-1-thiahexyl)benzyl]-1-cyclohexene, 1,2 - dibromo-4-[2-(6-hydroxy-4-oxa-1-thiahexyl)phenyl] - 1 - cyclohexene, 1,2,3 - tribromo-4-[2-(6-hydroxy-4-oxa-1-thiahexyl) benzyl]-1-cyclohexene, 1,2,3-tribromo-4-[2-(6-hydroxy-4-oxa-1-thiahexyl)phenyl]-1-cyclohexene, 1,3 - dibromo-4 - [3 - methyl-4-(6-hydroxy-4-oxa-1-thiahexyl)benzyl]-1-cyclo-hexene, 1,3-dibromo-4-[3-methyl-4-(6-hydroxy-4-oxa-1-thiahexyl)phenyl] - 1 - cyclohexene, 1,2,3,4,7,7-hexachloro-5-[2-(6-hydroxy-4-oxa - 1 - thiahexyl)phenyl] 2-norbornene, 1,2,3,4,7,7-hexachloro-5-[2-(6-hydroxy-4-oxa-1-thiahexyl)benzyl]-2-norbornene, 1,2,3,4,7,7-hexabromo-5-[2-(6-hydroxy-4-oxa-1-hexyl)phenyl] - 2 - norbornene, 1,2,3,4,7,7 - hexabromo-5-[2-(6-hydroxy-4-oxa- 1-thiahexyl)-benzyl]-2-norbornene, etc. As in the case of the aforementioned reactants the above insecticides are only representatives of the class of compounds which may be prepared and the present invention is not necessarily limited thereto.

The following examples are given to illustrate the process of the present invention, which, however, are not intended to limit the generally broad scope of the present invention in strict accordance therewith.

*Example I*

A solution of 15.0 g. (0.1 mole) of o-allyl-thiophenol and 27.3 g. (0.1 mole) of hexachlorocyclopentadiene in about 50 g. of toluene is heated under reflux at a temperature of about 120° C. for about 20 minutes after which time the toluene is gradually distilled off thus permitting the temperature of the solution to rise. After approximately 45 g. of toluene is removed during a period of about 2 hours the temperature will then rise to about 175° C. The solution is now heated for an additional period of 30 minutes without further removal of any toluene, after which the product is allowed to cool, is taken up in pentane, washed with dilute aqueous sodium bicarbonate and water, dried and subjected to fractional distillation at reduced pressure. The desired product, comprising 1,2,3,4,7,7-hexachloro-5-(2-mercaptobenzyl)-2-norbornene is separated therefrom.

A molecular proportion of the above mentioned norbornene compound and 2 molecular proportions of ethylene oxide are placed in a reaction vessel and heated to a temperature of about 125° C. in the presence of 0.7 g. of sodium acetate. The autoclave and contents thereof are maintained at this temperature for a period of about 1.5 hours, at the end of which time they are allowed to cool to room temperature. The reaction product is washed with water, then with pentane, dried and fractionally distilled at reduced pressure, the desired product, comprising 1,2,3,4,7,7-hexachloro-5-[2-(6-hydroxy-4-oxa-1-thiahexyl)benzyl]-2-norbornene, being separated therefrom.

*Example II*

A solution of 15.0 g. (0.1 mole) of o-allylthiophenol and 12.3 g. (0.1 mole) of 2,3-dichloro-1,3-butadiene in 50 g. of benzene is heated under reflux conditions for a period of about 6 hours after which time the product, comprising 1,2-dichloro-4-(2-mercaptobenzyl)-1-cyclohexene is recovered and treated as described in Example I above. One molecular proportion of the cyclohexene compound is reacted with 2 molecular proportions of ethylene oxide as hereinabove described in the desired condensation product, comprising 1,2-dichloro-4-[2-(6-hydroxy-4-oxa-1-thiahexyl)benzyl]-1-cyclohexene is separated and recovered.

*Example III*

A solution of 15.8 g. (0.1 mole) of 1,2,3,4-tetrachloro-1,3-butadiene and 15.0 g. (0.1 mole) of p-allyl-thiophenyl in 50 g. of xylene is heated under reflux conditions for a period of about 6 hours, after which the product is recovered in a manner similar to that set forth in Examples I and II above. The condensation product, comprising 1,2,3,6-tetrachloro-4-(4-mercaptobenzyl)-1-cyclohexene, is recovered and reacted with 8 molecular proportions of ethylene oxide per molecular proportion of the cyclohexene compound. The desired product, comprising 1,2,3,6-tetrachloro-4-[4-(24-hydroxy-4,7,10,13,16,19,22-heptaoxa-1-thiatetracosyl)benzyl]-1-cyclohexene is separated and recovered by conventional means.

*Example IV*

A solution of 13.6 g. (0.1 mole) of o-vinylthiophenol and 27.3 g. (0.1 mole) of hexachlorocyclopentadiene is refluxed in 50 g. of benzene in a manner similar to that described in Example I above. The reaction product, comprising 1,2,3,4,7,7-hexachloro-5-(2-mercaptophenyl)-2-norbornene is recovered and reacted with ethylene oxide in a mole ratio of 2 moles of ethylene oxide per mole of norbornene compound. The desired product, comprising 1,2,3,4,7,7-hexachloro-5-[2-(6-hydroxy-4-oxa-1-thiahexyl)phenyl]-2-norbornene is separated and recovered.

*Example V*

A solution of 16.4 g. of 4-allyl-o-thiocresol and 27.3 g. of hexachlorocyclopentadiene is refluxed in toluene in a manner similar to that set forth in the above examples. The reaction product of this condensation comprising 1,2,3,4,7,7-hexachloro-5-(3-methyl-4-mercaptobenzyl)-2-norbornene is recovered by conventional means hereinabove described and reacted with ethylene oxide in a mole ratio of 2 moles of ethylene oxide per mole of norbornene compound. The desired product comprising 1,2,3,4,7,7-hexachloro-5-[3-methyl-4-(6-hydroxy-4-oxa-1-thiahexyl)benzyl]-2-norbornene is separated and recovered.

*Example VI*

A solution of 15.0 g. (0.1 mole) of o-allylthiophenol and 27.3 g. (0.1 mole) of hexachlorocyclopentadiene in about 50 g. of toluene is heated under reflux conditions for a period of about 6 hours. The reaction product, comprising 1,2,3,4,7,7-hexachloro-5-(2-mercaptobenzyl)-2-norbornene is recovered and reacted with propylene oxide per mole of norbornene compound. The desired product, comprising 1,2,3,4,7,7-hexachloro-5-[2-(9-hydroxy-4,7-dioxa-3,6-dimethyl-1-thiadecyl)benzyl]-2-norbornene is separated and recovered.

*Example VII*

An insecticidal composition is prepared by dissolving 1 g. of 1,2,3,4,7,7-hexachloro-5-[2-(6-hydroxy-4-oxa-1-thiahexyl)benzyl]-2-norbornene in 2 cc. of benzene and adding 100 cc. of water, the benzene solution of the above named compound being emulsifiable therein in the absence of any emulsifying agent. This solution is sprayed into a cage containing common houseflies and causes a 100% knock-down and eventual kill.

Similar tests of other insecticides of Examples II to VI show that these compounds, like those of Example I, exhibit an effective knock-down ability with essentially equal killing power as compared to other insecticides which require the use of an emulsifying agent to make the latter water-dispersible.

We claim as our invention:

1. A process for the preparation of a polyoxyalkylene glycol monothioether of a thiophenolic derivative of a halocycloalkene which comprises condensing o-allylthiophenol with hexachlorocyclopentadiene at a temperature in the range of from about 20° to about 250° C., reacting the resultant 1,2,3,4,7,7-hexachloro-5-(2-mercaptobenzyl)-2-norbornene with three molecular proportions of propylene oxide, and recovering the resultant 1,2,3,4,7,7-hexachloro-5-[2-(9-hydroxy-4,7-dioxa-3,6-dimethyl-1-thiadecyl)benzyl]-2-norbornene.

2. A process for the preparation of a polyoxyalkylene glycol monothioether of a thiophenolic derivative of a halocycloalkene which comprises condensing p-allylthiophenol with 1,2,3,4-tetrachloro-1,3-butadiene at a temperature in the range of from about 20° to about 250° C., reacting a molecular proportion of the resultant 1,2,3,6-tetrachloro-4-(4-mercaptobenzyl)-1-cyclohexene with eight molecular proportions of ethylene oxide, and recovering the resultant 1,2,3,6-tetrachloro-4-[4-(24-hydroxy-4,7,10,13,16,19,22-heptaoxa-1-thiatetracosyl)benzyl]-1-cyclohexene.

3. A process for the preparation of a polyoxyalkylene glycol monothioether of a thiophenolic derivative of a halocycloalkene which comprises condensing o-vinylthiophenol with hexachlorocyclopentadiene at a temperature in the range of from about 20° to about 250° C., reacting a molecular proportion of the resultant 1,2,3,4, 7,7-hexachloro-5-(2-mercaptophenyl)-2-norbornene with two molecular proportions of ethylene oxide, and recovering the resultant 1,2,3,4,7,7-hexachloro-5-[2-(6-hydroxy-4-oxa-1-thiahexyl)phenyl]-2-norbornene.

4. A process for the preparation of a polyoxyalkylene glycol monothioether of a thiophenolic derivative of a halocycloalkene which comprises condensing o-allylthiophenol with hexachlorocyclopentadiene at a temperature in the range of from about 20° to about 250° C., reacting a molecular proportion of the resultant 1,2,3,4,7,7-hexachloro-5-(2-mercaptobenzyl)-2-norbornene with two molecular proportions of ethylene oxide, and recovering the resultant 1,2,3,4,7,7-hexachloro-5-[2-(6-hydroxy-4-oxa-1-thiahexyl)benzyl]-2-norbornene.

5. A process for the preparation of a polyoxyalkylene glycol monothioether of a thiophenolic derivative of a halocycloalkene which comprises condensing 4-allyl-o-thiocresol with hexachlorocyclopentadiene at a temperature in the range of from about 20° to about 250° C., reacting a molecular proportion of the resultant 1,2,3,4,7,7 - hexachloro - 5-(3-methyl-4-mercaptobenzyl)-2-norbornene with two molecular proportions of ethylene oxide, recovering the resultant 1,2,3,4,7,7-hexachloro-5-[3-methyl - 4 - (6-hydroxy-4-oxa-1-thiahexyl)benzyl]-2-norbornene.

6. An insecticidal composition comprising a polyoxyalkylene glycol monothioether of a thiophenolic derivative of a halocycloalkene.

7. An insecticidal composition comprising a 1,2,3,4,7,7-hexachloro-5-[2-(9-hydroxy-4,7-dioxa-3,6-dimethyl-1-thiadecyl)benzyl]-2-norbornene.

8. An insecticidal composition comprising a 1,2,3,6-tetrachloro - 4 - [4-(24-hydroxy-4,7,10,13,16,19,22-heptaoxa-1-thiatetracosyl)benzyl]-1-cyclohexene.

9. An insecticidal composition comprising a 1,2,3,4,7,7 - hexachloro-5-[2-(6-hydroxy-4-oxa-1-thiahexyl)benzyl]-2-norbornene.

10. An insecticidal composition comprising a 1,2,3,4,7,7 - hexachloro-5-[2-(6-hydroxy-4-oxa-1-thiahexyl)phenyl]-2-norbornene.

11. An insecticidal composition comprising a 1,2,3,4,7,7 - hexachloro - 5-[3-methyl-4-(6-hydroxy-4-oxa-1-thiahexyl)benzyl]-2-norbornene.

No references cited.